Jan. 10, 1933.   N. E. WAHLBERG   1,893,721
AUTOMOBILE FRAME
Filed Aug. 31, 1928   2 Sheets-Sheet 1
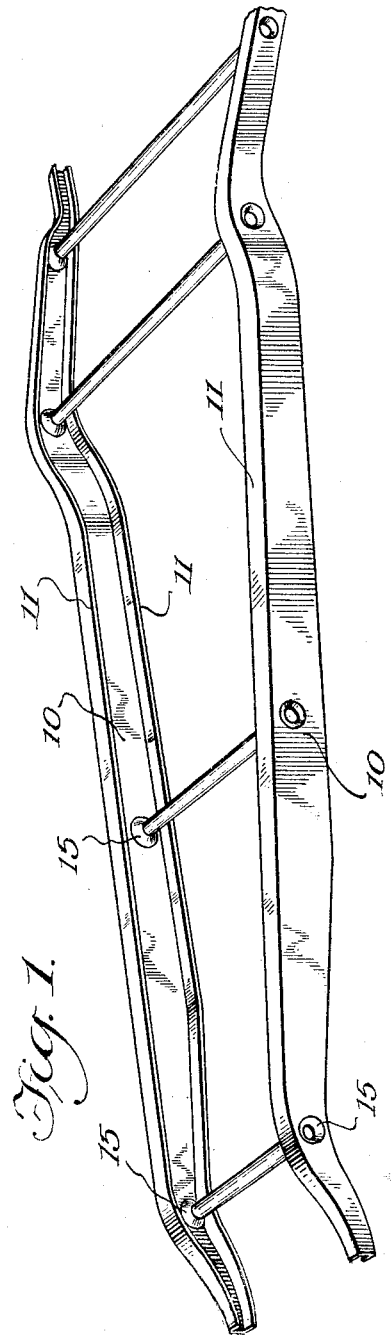
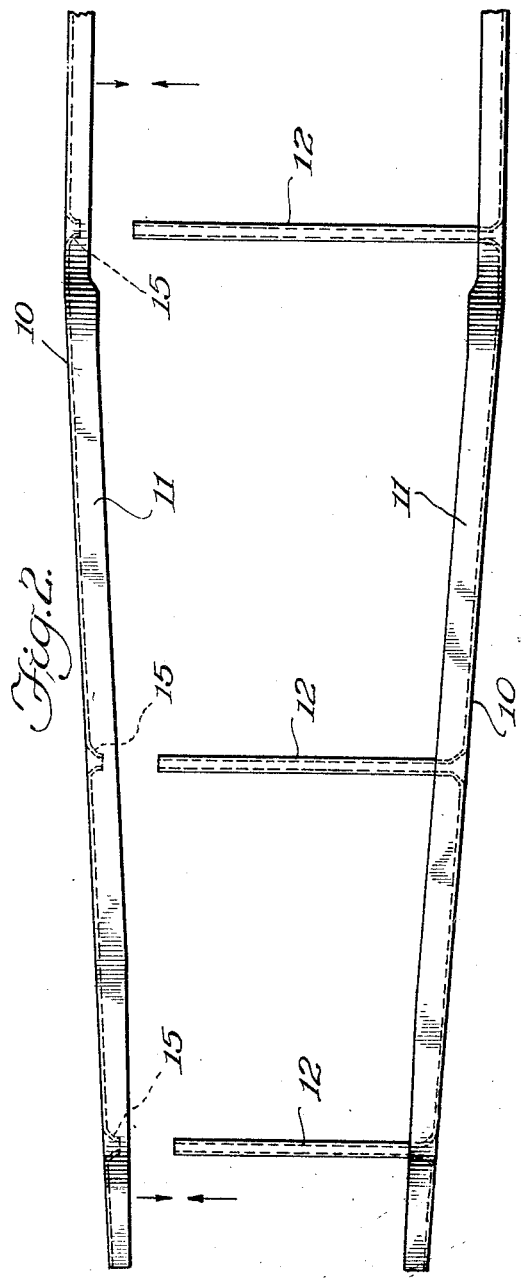
Inventor
Nils E. Wahlberg

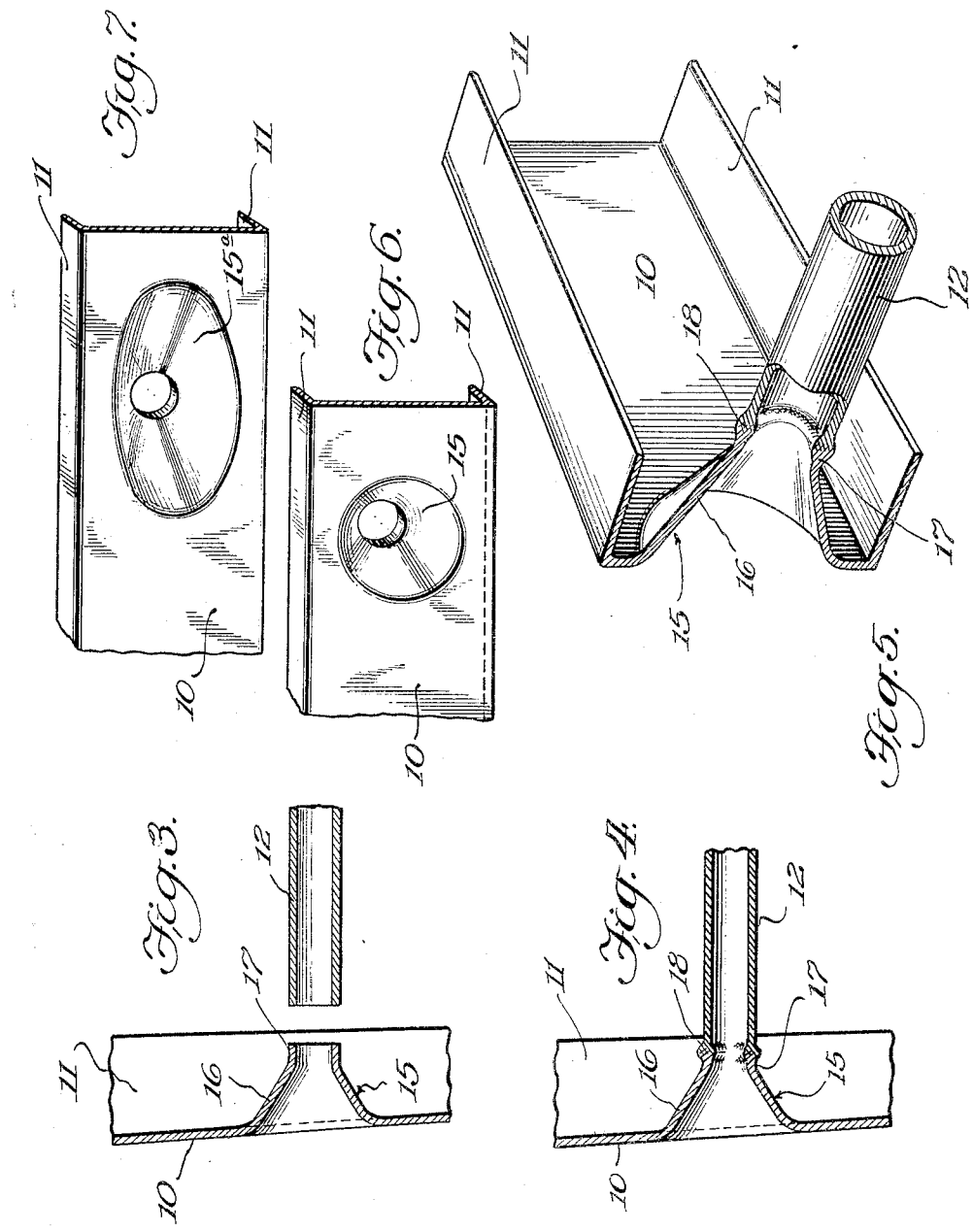

Patented Jan. 10, 1933

1,893,721

UNITED STATES PATENT OFFICE

NILS ERIK WAHLBERG, OF KENOSHA, WISCONSIN, ASSIGNOR TO THE NASH MOTORS COMPANY, OF KENOSHA, WISCONSIN, A CORPORATION OF MARYLAND

AUTOMOBILE FRAME

Application filed August 31, 1928. Serial No. 303,155.

This invention relates to improvements in frames and more particularly to pressed steel automobile frames and the method of welding the same whereby the side frames and cross members are connected into an integral piece.

The object of the invention is to provide an improved construction and arrangement of parts including tubular cross members and the method of welding them to the side frame members, whereby an especially strong and rigid construction is obtained, and said frames may be produced with greater economy in less time and without the attendant difficulty of warping or getting out of shape, as is usually the case with ordinary riveted frame structures. Other objects of the invention will appear from time to time as the description proceeds.

The invention may best be understood by reference to the accompanying drawings, in which Figure 1 is a perspective view of an automobile frame constructed in accordance with my invention.

Figure 2 is a plan view of a portion of the frame showing it in the process of manufacture and illustrating the method whereby the several cross members may be joined to a side frame in one welding operation.

Figure 3 is an enlarged view showing the arrangement of one of the cross frame members before it is welded to the side frames.

Figure 4 is a view similar to Figure 3, but showing the parts after they are welded.

Figure 5 is an enlarged perspective view of a section of the side frame and cross member in welded position, as in Figure 4.

Figure 6 is a fragmentary view of the outer face of a side frame showing one form of connecting nipple in which said nipple is substantially circular in shape, and Figure 7 is a modified form of connecting nipple in which the base of the nipple is elliptical.

Referring now more particularly to details of the invention illustrated in the drawings, it will be seen that I provide an automobile frame made up of a plurality of pressed-steel side frame members 10, 10, having inwardly formed upper and lower flanges 11, 11, of the usual form, to which tubular cross members 12, 12 are directly welded. I am aware that it has been heretofore proposed to weld tubular cross members to flanged end members which in turn are welded or riveted to side frame members, but in the present invention I initially form the side frame members during the forming or pressing operation with nipples suitable to be directly welded to tubular cross members as will now be described.

In carrying out my invention I provide an improved form of nipple which is particularly advantageous in order to provide the desired rigidity and strength at the point of connection of the cross members and side frames. As shown in the drawings, these nipples are indicated generally at 15, 15 and each comprises a relatively deep depression extending inwardly from the outer face of the side frame members 10, with walls 16, 16 converging inwardly in frusto conical shape to a circular portion 17, of the proper shape to be welded directly to the tubular cross members 12. In the preferred form shown, the cross members 12 are of circular cross section and are butt-welded to the nipples 15, and in this form the portion 17 of said nipples is of substantially the same shape, size and thickness as the adjacent ends of the tubular cross members 12. It will be understood, however, that the shape of the nipples may vary, depending upon the shape of the cross members employed and furthermore, other methods of welding may be employed as for instance lap-welding, in which case the ends of the nipples may be larger or smaller than the cross members 12 to which they are connected.

In the form shown in Figures 5 and 6, it will be seen that the base of the nipple 15 is substantially circular in form, and the arrangement is such that the upper and lower margins of the walls 16, 16 are adjacent the upper and lower flanges 11, 11 of the side frame and form an obtuse flaring connection with the vertical web of the side frame adjacent said upper and lower flanges. It will be seen in Figure 7, however, that the shape of the nipple may be varied, as for instance by elongating the base thereof longitudinally of the side frame into substantially elliptical form, as indicated at 15a.

It will be understood that the shape of the nipples 15, 15 is such as to readily lend themselves to be drawn in an ordinary pressing operation and preferably, during the same operation in which the marginal flanges 11, 11 are formed, which pressing operations will be well understood by those skilled in the art.

Referring now to the method of welding the cross members 12 to the nipples 15, Figure 2 indicates a preferred method whereby all of the cross members 12 may be welded in a single operation by the electrical resistance method well known in the art. The cross nipples 12, 12 and the corresponding nipples 15, 15 are mounted in any suitable guides so as to be moved toward each other, and at the same time, electrical connections may be completed through the side frame and the several cross members so as to pass a current simultaneously across the several joints, and thus form a series of butt-welds 18, 18, in the usual manner.

As will be understood by those skilled in the art, all of the butt-welds 18, 18 formed as above described, may be readily formed of uniform strength during a single welding operation, owing to the well-established phenomenon wherein the welding currents through a plurality of welding points tend to equalize themselves due to the increased resistance produced at any one of the points which might initially tend to pass more current than the remaining welding points in the circuit. During the welding operation the adjacent ends of portions 17 and 12 are reduced somewhat in length, in the usual manner, to form a welded joint 18.

Among the advantages of the invention above described is the ease and simplicity of construction whereby all riveting, bolting or the like is entirely eliminated, and the frame is welded into a single integral piece having required strength and rigidity at the point of connection of the cross members and the side frame. The nipples 15, 15 are readily formed during the pressing operation of the side frame and are of such shape as to resist the stresses imposed upon them.

As a further advantage of my improved method of forming a plurality of welds in a single operation, it will be understood that the frame so formed is not subject to warping or getting out of shape as is the case where the several joints may be welded separately, or as is especially noticeable in ordinary forms of riveted frame structures, wherein a large proportion of such latter frames are found to be twisted out of proper shape, no matter how great care is taken in their fabrication.

I claim:

1. An automobile frame including pressed steel flanged side frame members and tubular cross members, said side frame members being initially formed with open ended inwardly extending nipples pressed directly from said frame members having their side walls flared outwardly toward and adjacent the upper and lower flanges thereof and having the open end of said nipples welded directly to the adjacent ends of the tubular cross members.

2. A frame structure including a pressed steel side frame member having outwardly converging open ended nipples with relatively straight intermediate walls pressed in its upright web, and a tubular cross member welded to the open end of said nipple.

3. A frame structure including a pressed steel side frame member having outwardly converging open ended nipples with relatively straight intermediate walls pressed in its upright web, and a tubular cross member butt-welded directly to the open end of said nipple.

4. An automobile frame structure including a flanged pressed steel side frame member having an upright web, and a nipple pressed in said upright web having outwardly converging intermediate walls and a tubular open end, and a tubular cross member welded directly to the open end of said nipple, the connecting walls of said cross member, nipple and upright web all being of substantially uniform thickness.

5. An automobile frame structure including a flanged pressed steel side frame member having an upright web, a nipple of frusto-conical formation formed in said upright web, and occupying at its base a substantial portion of the web section, said nipple terminating in a tubular reduced end portion, and a tubular cross member welded directly to the open end of the nipple and forming with the nipple and upright web, wall portions of substantially uniform thickness.

6. An automobile frame structure including a flanged pressed steel side frame member having an upright web, an open ended nipple of frusto-conical formation pressed in said upright web, the base of said nipple occupying a substantial portion of the web section and the wall of said nipple converging outwardly to terminate in a substantially tubular extremity, a tubular cross member welded directly to the open tubular end of said nipple and forming with the nipple and upright web, wall portions of uniform thickness, whereby stress is distributed uniformly through the parts and to a large area of said upright web.

Signed at Kenosha, Wis., this 28th day of August, 1928.

NILS ERIK WAHLBERG.